Feb. 19, 1952 W. K. COLLETTE 2,586,206
TRUCK RIM DESIGN
Filed Jan. 6, 1947 3 Sheets-Sheet 1

INVENTOR
WILLIAM K. COLLETTE
BY Ely + Frye
ATTORNEYS

Feb. 19, 1952 — W. K. COLLETTE — 2,586,206
TRUCK RIM DESIGN
Filed Jan. 6, 1947 — 3 Sheets-Sheet 2
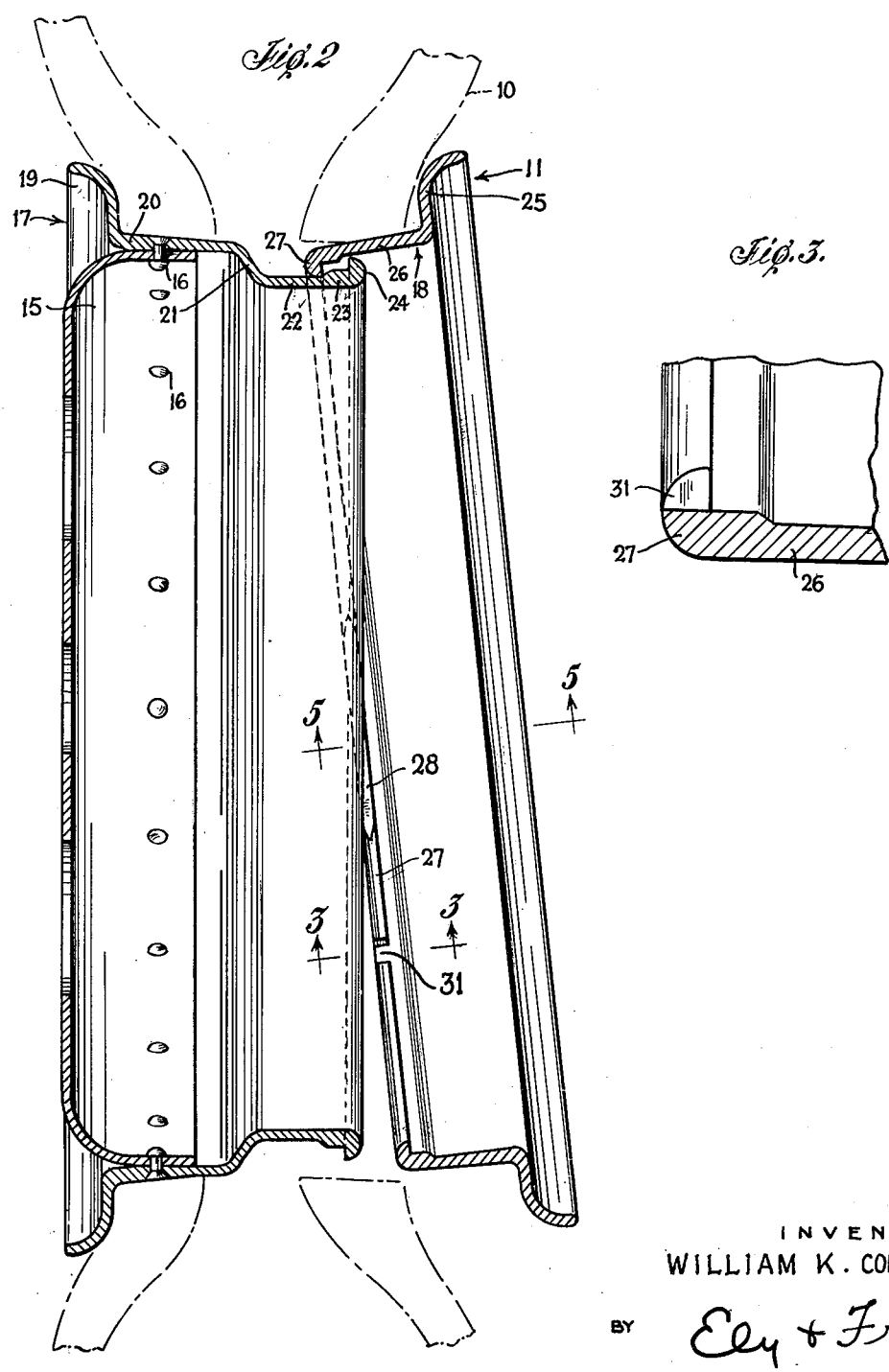
INVENTOR
WILLIAM K. COLLETTE
BY Ely + Frye
ATTORNEYS Feb. 19, 1952     W. K. COLLETTE     2,586,206
TRUCK RIM DESIGN Filed Jan. 6, 1947     3 Sheets-Sheet 3

INVENTOR
WILLIAM K. COLLETTE
BY Ely & Frye
ATTORNEYS

UNITED STATES PATENT OFFICE 2,586,206

TRUCK RIM DESIGN

William K. Collette, Akron, Ohio, assignor to The Firestone Tire & Rubber Company, Akron, Ohio, a corporation of Ohio Application January 6, 1947, Serial No. 720,337

6 Claims. (Cl. 152—411)

This invention relates to tire rims for use with pneumatic tires, and more especially it relates to truck tire rims on which are mounted tires which in service are sometimes subjected to low-inflation pressure.

With the advent of higher speed and more severe braking in trucks equipped with pneumatic tires the problem of the tires slipping or creeping on their rims has been aggravated. The conventional truck tire rim has one detachable side flange in order to facilitate mounting the tire upon the rim. Heretofore the tire bead seat, adjacent the nonremovable side flange, has been formed with a five per cent taper, the relative diameter of the bead seat of the rim and the inside of the tire bead being such that when the tire was inflated on the rim, the tire bead adjacent the nonremovable flange would be forced, by the inflation pressure, upon said tapered portion so that a very tight tire bead fit to the rim, adjacent said nonremovable flange, was accomplished. However, so far as applicant has been able to learn, no satisfactory means of providing a five degree taper, or any taper, for the bead seat on the side of the tire rim which carries the removable flange has been devised. One of the problems of providing such a tapered bead seat, on the removable flange side of the rim, has been that it was impossible, in mounting a tire on a rim having such taper, to get the beads of the tire over the lateral edge of the rim.

An object of the present invention is to provide a truck tire rim having both bead seats tapered, whereby tighter bead seats are obtained than has been possible heretofore.

Another object of the present invention is to provide a longitudinally split two piece rim having a drop center of considerable depth.

Another object of the present invention is to provide a tapered bead seat integral with a removable side flange of a tire rim.

A further object of the present invention is to provide a removable rim side flange having a tapered bead seat integral therewith, which flange is adapted to be placed in position, on the base of the rim, after a tire has been mounted on the rim, and before the tire has been inflated.

Yet another object of the present invention is to provide a truck tire rim having a removable side flange with a tapered bead seat integral therewith, which flange can be easily mounted on and removed from the rim.

A still further object is to provide a truck tire rim having tapered bead seats with a removable side flange, which rim is strong, light, safe and economical to manufacture.

Other objects and advantages of the present invention will be apparent from a consideration of the following detailed description.

Referring to the accompanying drawings:

Fig. 2 is a sectional view taken on line 2—2 of Fig. 4;

Fig. 3 is a sectional view taken on line 3—3 of Fig. 2;

Figure 1:
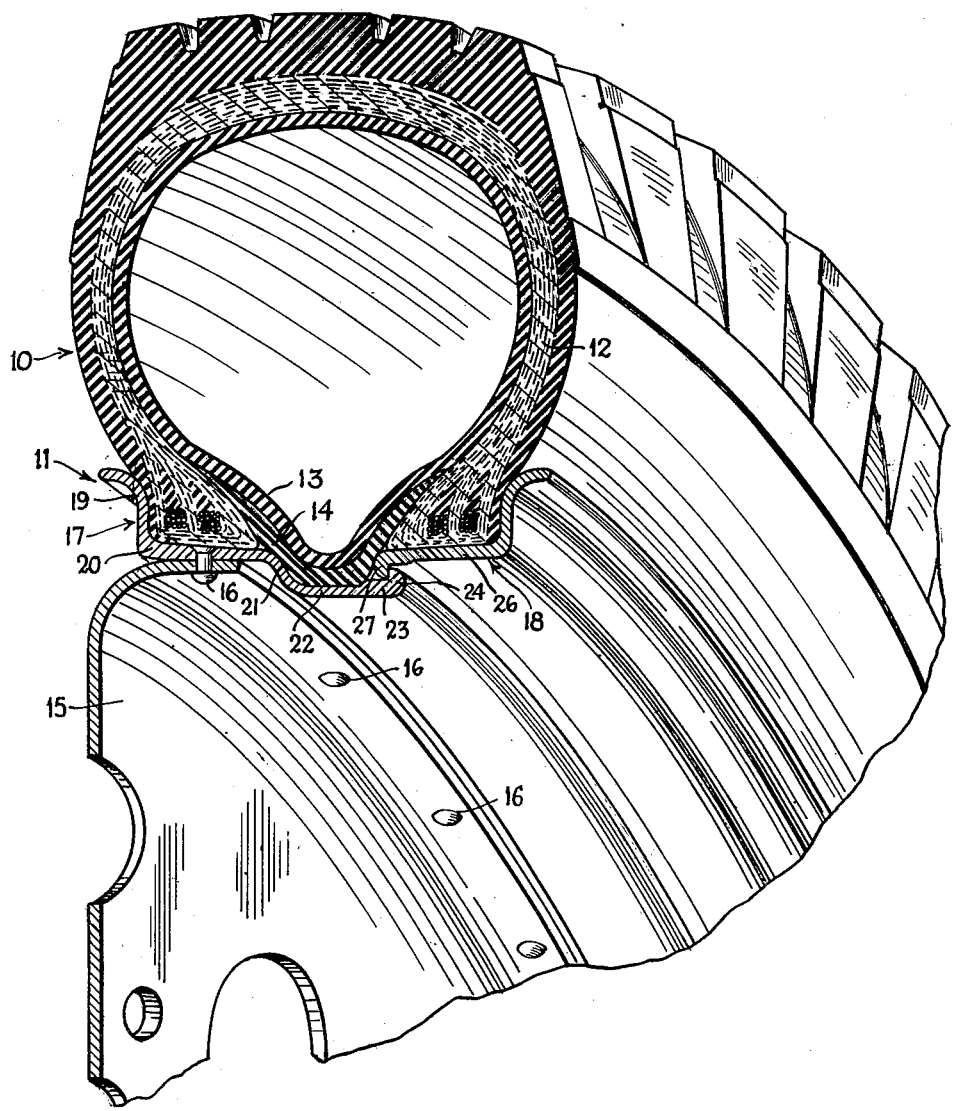
Fig. 1 is a fragmentary perspective view of an inflated tire in section mounted on a rim embodying the present invention.
Figure 4:
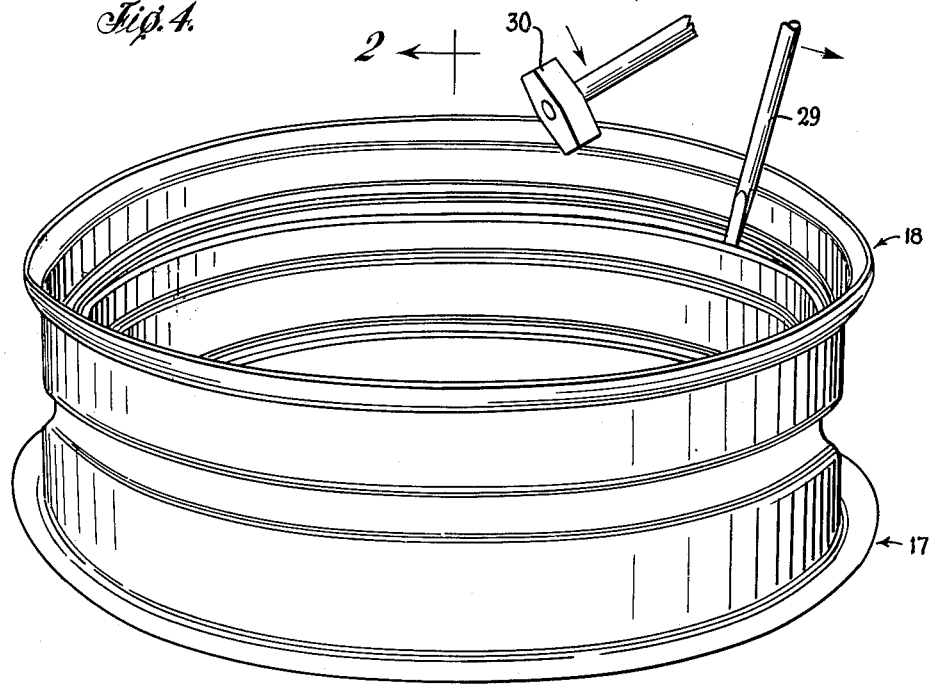
Fig. 4 is a perspective view of the rim of Fig. 1 but illustrating the manner of application of the removable flange to the rim base proper.
Figure 5:
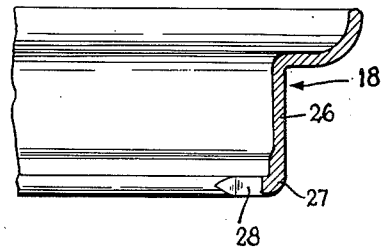
Fig. 5 is a sectional view of ring 18 taken on line 5—5 of Fig. 2.

Referring more particularly to the drawings it will be seen that there is shown an assembly generally designated 10, comprising an improved straight side tire rim 11. The tire rim 11 has mounted thereon a tire 12, the latter including the usual inflatable inner tube 13, and flap 14. Rim 11 is attached to a wheel by any means found satisfactory as, for example, through the medium of a disc 15 to which the rim is attached by rivets 16. In turn disc 15 is attached to a wheel hub not shown, as will be understood by those familiar with the art.

As shown in Fig. 1, the tire rim 11 comprises two endless annular members 17 and 18. These members assembled as shown in Fig. 2 form a circumferentially split two piece rim. Member 17 comprises a rim side flange 19, a tapered bead seat 20, a radially inwardly extending portion 21 and a base 22, said base terminating at its edge opposite flange 19 in a thickened portion 23, which portion has a radially outwardly extending marginal flange 24.

Member 18 is removable attached to member 17 as will be explained hereinafter. Member 18 comprises a rim side flange 25, a tapered bead seat 26, and a radially inwardly extending flange 27. The inside diameter of flange 27 is smaller than the outside diameter of flange 24. The smallest outside diameter of tapered bead seat 20 is greater than said outside diameter of flange 24. It is to be noted that the outside diameter of base 22 is less than the outside diameter of tapered bead seats 20 and 26, and the thickened portion 23 whereby when assembled the rim is a semi drop center rim. Particular attention is directed to the radially inward step-off from the thickened portion to the base 22 of the rim. The radial extent of flange 24 is less than that of flange 27 and by reference to Figure 1 it will be seen that the inside diameter of flange 27 is no greater than the outside diameter of the thickened portion 23 adjacent flange 24.

The operation of assembling the components illustrated in Fig. 1 will now be described, reference being had to Figs. 1 to 5 inclusive. With the rim members 17 and 18 separated, the tire 12 is tubed and flapped by workman with tube 13 and flap 14 with no, or only slight inflation pressure in the tube so that the flap is not forced radially inwardly of the tire beads and thus will not interfere with passing the tire beads over the rim bead seats. With member 18 out of the way the tire with its tube and flap is placed on member 17 with one bead pressed onto tapered bead seat 20 as far as it can be forced manually. In actual practice the tire bead can seldom, if ever, be manually pressed against the side flange 19. Next the member 18 is attached to member 17, by first pushing the other bead of the tire, as far as can be conveniently done, toward flange 17, in order to get this bead out of the way of member 18. Flange 27 of member 18 is passed over flange 24 of member 17. Since flange 27 has a smaller inside diameter than the outside diameter of flange 24, it is necessary to utilize the drop center feature of member 17 in order to pass smaller flange over the larger. Referring now to Fig. 2 a portion of member 18 is passed over flange 24, with flange 27 drawn down into the drop center portion of member 17 as shown. To further facilitate the passing of flange 27 over flange 24, two relatively short crescent notches 28 (only one shown) are cut into flange 27. Notches 28 are placed diametrically opposite to each other in flange 27 and provides some additional clearance, or radial relief between flanges 27 and 24. If found necessary a tire iron 29 and hammer 30 or other tools may be used to pry flange 27 over flange 24 as illustrated somewhat diagrammatically in Fig. 4. An advantage of the present rim construction is that annular member 18 may be manually sprung into slightly elliptical shape by the use of the tire tool 29 used as a pry as illustrated. This further facilitates the assembling of members 17 and 18 as will be readily understood by those skilled in assembling tire rims.

After flange 27 has passed over flange 24 the tube 13 is inflated by means of an air hose and the usual tube valve and stem, the hose, valve and stem not being shown since they are well known and not claimed in the present application. The internal pressure in the tube forces the beads of the tire apart and member 18 laterally of member 17 until flange 27 abuts flange 24 and is retained against further lateral movement thereby. As the internal pressure builds up in the tube the sides of flap and the tube 13 press axially outwardly against the beads and sides of the tire until the tire beads are pressed upon the tapered rim bead seats 20 and 26 with the sides of the beads pressed firmly against rim side flanges 19 and 25. The said internal pressure also forces the flap and the base of the tube radially inwardly until the base of the flap seats against the rim base 22. With the tube inflated to the proper pressure the assembly is ready to be run in service.

Since the rim member 18 is provided with a tapered seat 26 similar to seat 20 it will now be seen that a truck rim has been provided on which both tire beads have a tight fit, instead of only one tire bead. It will also be seen that the extreme ends of the toes of the tire beads come into contact with the flap which condition is made possible by the drop center feature of the rim, this feature avoiding "bridging" of the flap or tube at the toe of the tire bead which "bridging" is common when rims of the prior art are used.

In dismounting the tire the steps of mounting or assembling set out above are reversed. A notch 31 in flange 27 provides an opening in which the end of a tire iron may be inserted in lifting flange 27 over flange 24 in starting to separate members 17 and 18 preparatory to removing the tire. It is to be noted that with member 18 detached the outside diameter of flange 24 is less than the inside diameter of the beads of the tire. Consequently there is no portion of the rim obstructing the removal of the tire from member 17.

Modifications may be resorted to without departing from the spirit of the invention which therefore is to be limited only by the appended claims and the prior art.

What is claimed is:

1. A two-member circumferentially split tire rim, each said member being continuous and having a tire rim side flange and a tapered tire bead seat formed integral therewith, and each said member having formed integrally therewith a circumferentially extending radially projecting locking flange on its margin opposite its said side flange, said locking flanges interlocking and said flanges and said margins being the only contact of said members when the latter are assembled in operative relation.

2. In a tire rim, the combination of two continuous annular members, one said member comprising a tire retaining flange, and a radially inwardly sloped tire bead seat formed integral therewith, said bead seat merging into a radially and axially inwardly extending portion which in turn merges into a relatively thin axially extending rim base portion, said base portion terminating in a thickened marginal portion whose external diameter is greater than the external diameter of said base, the lateral margin of said thickened portion being in the form of a circumferentially extending radially outwardly projecting flange, said outwardly extending flange having an external diameter smaller than the external diameter of said bead seat at any point thereof; the other said member comprising a tire retaining flange, a sloped bead seat formed integral therewith, said last named bead seat portion terminating at its marginal edge opposite the latter mentioned flange in a thickened portion, said latter thickened portion having a circumferentially extending radially inwardly projecting flange, the inside diameter of said inwardly projecting flange being less than the outside diameter of said outwardly projecting flange, said inwardly projecting flange having diametrically opposite diameter relief notches cut therein.

3. In a tire rim, the combination of two continuous annular members, one said member comprising a tire retaining flange, and a radially inwardly sloped tire bead seat formed integral therewith, said bead seat merging into a radially and axially inwardly extending portion which in turn merges into a relatively thin axially extending rim base portion, said base portion terminating in a thickened marginal portion whose external diameter is greater than the external diameter of said base, the lateral margin of said thickened portion being in the form of a circumferentially extending radially outwardly projecting flange, said outwardly extending flange having an external diameter smaller than the external diameter of said bead seat at any point thereof; the other said member comprising a tire retaining flange, a sloped bead seat formed integral therewith, said bead seat portion terminating at its marginal edge opposite the latter mentioned flange in a circumferentially extending radially inwardly projecting flange, the inside diameter of said inwardly projecting flange being less than the outside diameter of said outwardly projecting flange, said inwardly projecting flange having diametrically opposite clearance spaces cut therein.

4. In a tire rim, the combination of two continuous annular members, one said member comprising a tire retaining flange, and a radially inwardly sloped tire bead seat formed integral therewith, said bead seat merging into a radially and axially inwardly extending portion which in turn merges into a relatively thin axially extending rim base portion, the lateral margin of said rim base portion being in the form of a circumferentially extending radially outwardly projecting flange, said outwardly extending flange having an external diameter smaller than the external diameter of said bead seat at any point thereof; the other said member comprising a tire retaining flange, a sloped bead seat formed integral therewith, said bead seat portion terminating at its marginal edge opposite the latter mentioned flange in a thickened portion, said thickened portion having a circumferentially extending radially inwardly projecting flange, the inside diameter of said inwardly projecting flange being less than the outside diameter of said outwardly projecting flange, said inwardly projecting flange having diametrically opposite clearance spaces cut therein.

5. In a tire rim, the combination of two continuous annular members, one said member comprising a tire retaining flange, a radially inwardly sloped tire bead seat formed integral therewith, said bead seat merging into a radially and axially inwardly extending portion which in turn merges into a relatively thin axially extending rim base portion, the lateral margin of said rim base portion opposite the first mentioned flange terminating in a thickened portion, said thickened portion having a circumferentially extending radially outwardly projecting marginal flange, said outwardly extending flange having an external diameter smaller than the external diameter of said bead seat at any point thereof; the other said member comprising a tire retaining flange, a slope bead seat formed integral therewith, said last named bead seat portion terminating in a thickened portion, said latter thickened portion at its marginal edge opposite the latter mentioned flange having a circumferentially extending radially inwardly projecting flange, the inside diameter of said inwardly projecting flange being less than the outside diameter of said outwardly projecting flange, the inside diameter of said inwardly projecting flange being no greater than the radially outside diameter of the thickened portion of the first mentioned member adjacent its said marginal flange.

6. In a tire rim, the combination of two continuous annular members, one said member comprising a tire retaining flange, a radially inwardly sloped tire bead seat formed integral therewith, said bead seat merging into a radially and axially inwardly extending portion which in turn merges into a relatively thin axially extending rim base portion, the lateral margin of said rim base portion opposite the first mentioned flange terminating in a thickened portion, said thickened portion having a circumferentially extending, radially outwardly projecting marginal flange, said outwardly extending flange having an external diameter smaller than the external diameter of said bead seat at any point thereof; the other said member comprising a tire retaining flange, a sloped bead seat formed integral therewith, said bead seat portion terminating in a thickened portion, said latter thickened portion at its marginal edge opposite the latter mentioned flange having a circumferentially extending, radially inwardly projecting flange, the inside diameter of said inwardly projecting flange being less than the outside diameter of said outwardly projecting flange, the two members having contacting surfaces forming a radial bearing when the rim is assembled in operative relation.

WILLIAM K. COLLETTE.

REFERENCES CITED

The following references are of record in the file of this patent:

UNITED STATES PATENTS

| Number | Name | Date |
| --- | --- | --- |
| 737,745 | Kronenberg | Sept. 1, 1903 |
| 1,820,173 | Baker | Aug. 25, 1931 |
| 1,846,240 | Woodward | Feb. 23, 1932 |
| 1,963,854 | Kranz | June 19, 1934 |
| 2,059,851 | Corbin | Nov. 3, 1936 |
| 2,164,984 | Brink | July 4, 1939 |
| 2,172,254 | Mueller | Sept. 5, 1939 |
| 2,367,823 | Brink | Jan. 23, 1945 |